J. F. MILLER.
Spring-Tug Links.

No. 214,784. Patented April 29, 1879.

Witnesses
Francis L. Clark
Erwin Bartberger

Inventor
John F. Miller
By Attorney
Wm. M. Cuthbert

UNITED STATES PATENT OFFICE.

JOHN F. MILLER, OF PITTSBURG, PENNSYLVANIA, ASSIGNOR TO DANIEL RISHER AND DANIEL R. McCLURE, OF SAME PLACE.

IMPROVEMENT IN SPRING TUG-LINKS.

Specification forming part of Letters Patent No. 214,784, dated April 29, 1879; application filed February 11, 1879.

*To all whom it may concern:*

Be it known that I, JOHN F. MILLER, of the city of Pittsburg, in the county of Allegheny and State of Pennsylvania, have invented a new and useful Improvement in Spring Tug-Links, which invention is fully described in the following specification and accompanying drawings.

My invention relates to spring-links for draft-tugs of harness, which can be attached to the harness of a horse or team to relieve them from sudden blows, jerks, or strains when starting a load or when drawing the same.

The object of my invention is to furnish a spring tug-link which can be easily put together and cheaply manufactured, and also to protect draft-animals when drawing or starting a load from sudden blows or strains.

The invention consists, in a spiral spring of suitable resistance, of two staples the shafts of which are each a quarter-segment in size and form, and which miter together, so as to form a barrel whose external diameter corresponds to the internal diameter of the spring, the free end of each segmental shaft or stem having flanges projecting outwardly from their end periphery.

Figure 1:
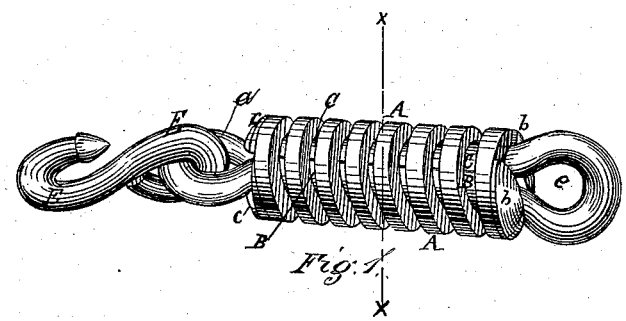
Figure 2:
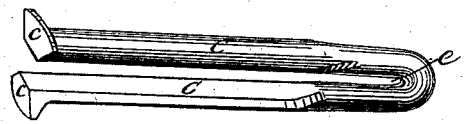
Figure 3:
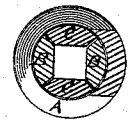

The invention is illustrated in detail in the drawings, in which Figure 1 is a perspective view of the link, all the parts being in proper relation to each other, the spring being fully expanded and at rest. Fig. 2 is a perspective view of one of the segmental staples, and shows the projecting flanges on its free ends, and also the shape of the loop end before it is swaged into a ring after being passed through the spring, as hereinafter described. Fig. 3 is a cross-section taken at the line *x x* of Fig. 1, and shows the segmental stems of the staples mitered together and forming a barrel, surrounded by the spring.

A is the spiral spring. B is one of the staples, its arched end being formed into a large eye or ring, *a*. *b b* are its flanges, which project outwardly from the periphery of the stem such distance that when the staple is in proper relation with the spring the periphery of the flanges will be even and correspond with the periphery of the spring. (See Fig. 1.)

C is the other segmental staple. *c c* are its flanges. Said staple and its flanges are the same in all respects as staple B, above described, except that its loop end *e* is long and in width corresponds to the internal diameter of the spring, (see Fig. 2,) so that it can be passed through the spring when the link is being put together, as hereinafter described. Said segmental staples are of such length that their loop or arched ends will project beyond the ends of the spring for attachment to the harness or vehicle, while the flanges on their free ends will engage and bear up on the end of the spring opposite to the one from which the loop or ring projects, the said staples passing longitudinally through the spring in opposite directions, the one to the other, as shown in Fig. 1, and the spring being confined on the barrel formed by the segments, between the flanges of one staple and the flanges of the other.

In putting the device together the free ends of the staple B are pressed toward each other, so as to reduce their width, that the flanges may pass through the spring. In this way this staple is placed inside of the spring, the ring *a* engaging the one end, and the flanges *b b*, being at the opposite end, are separated and take bearing on the spring. When this is accomplished the staple C is looped or hooked through the eye *a*, and then passed loop end first through the spring, the mitered edges of C engaging and sliding on those of B until the flanges *c c* engage the end of the spring, the same as do the flanges *b b* at the opposite end, but at right angle to them. The long narrow loop of staple C is then placed in a former, and is swaged by driving a punch down through it, which forces it into the shape of a ring, and swells its sides out so as to engage the end of the spring and lock all the parts together.

The staples are made of malleable metal, so that they may be swaged after putting the device together, the staple B, however, having the ring *a* formed at the first, as shown in Fig. 1.

By this method of construction it will be seen that all the parts may be cast except the spring, so that they can be easily and quickly put together, and that a great saving in labor is secured.

Operation: The link being as shown in Fig. 1, it is attached in the tug of the harness, and when traction of sufficient force is made on it the spring is compressed between the flanges of the segments, the staples sliding and guiding each other by their mitered edges, which also hold the flanges $b\ b\ c\ c$ out against the ends of the spring, the spring receiving and compensating for any sudden blow or jerk caused by the wheels of the vehicle striking any obstruction in the roadway, thus protecting the shoulders of the draft-animal.

Having thus described my invention, its construction, and operation, what I claim, and desire Letters Patent for, is—

1. In a spring draft-tug, the spiral spring A and the segmental staples B C, passing longitudinally through said spring, and provided with flanges which project and bear on the ends of the spring, all combined, arranged, and operating as and for the object specified.

2. In a spring draft-tug, the staples B C, the stems of which form segments of a circle, and are provided with projecting flanges cast on the periphery of their free ends, which relate to and take bearing on the ends of a spiral spring, substantially as and for the object set forth.

3. In a spring tug-link, the segmental stems of the staples B C, adapted to move longitudinally in opposite directions, and guiding each other by their mitered edges, as and for the object set forth.

4. In a spring tug-link, the spiral spring A, confined on the periphery of the barrel formed by the segmental stems of the staples, and between the flanges $b\ b\ c\ c$, as and for the object set forth.

5. The combination, in a spring-link device, of the spring A and staples B C, having flanges $b\ b\ c\ c$, all constructed, arranged, and operating as and for the object described.

6. The improved process in manufacturing spring tug-links, consisting of, first, casting the segmental staples of a diameter approximate to the internal diameter of the encircling spring, then passing them through the spring, one or both loop end first, then enlarging the loop end of the staple or staples, so as to confine them permanently within the spring.

JOHN F. MILLER.

In presence of—
DANIEL RISHER,
ALBERT J. HARNACK.